Patented Mar. 7, 1950

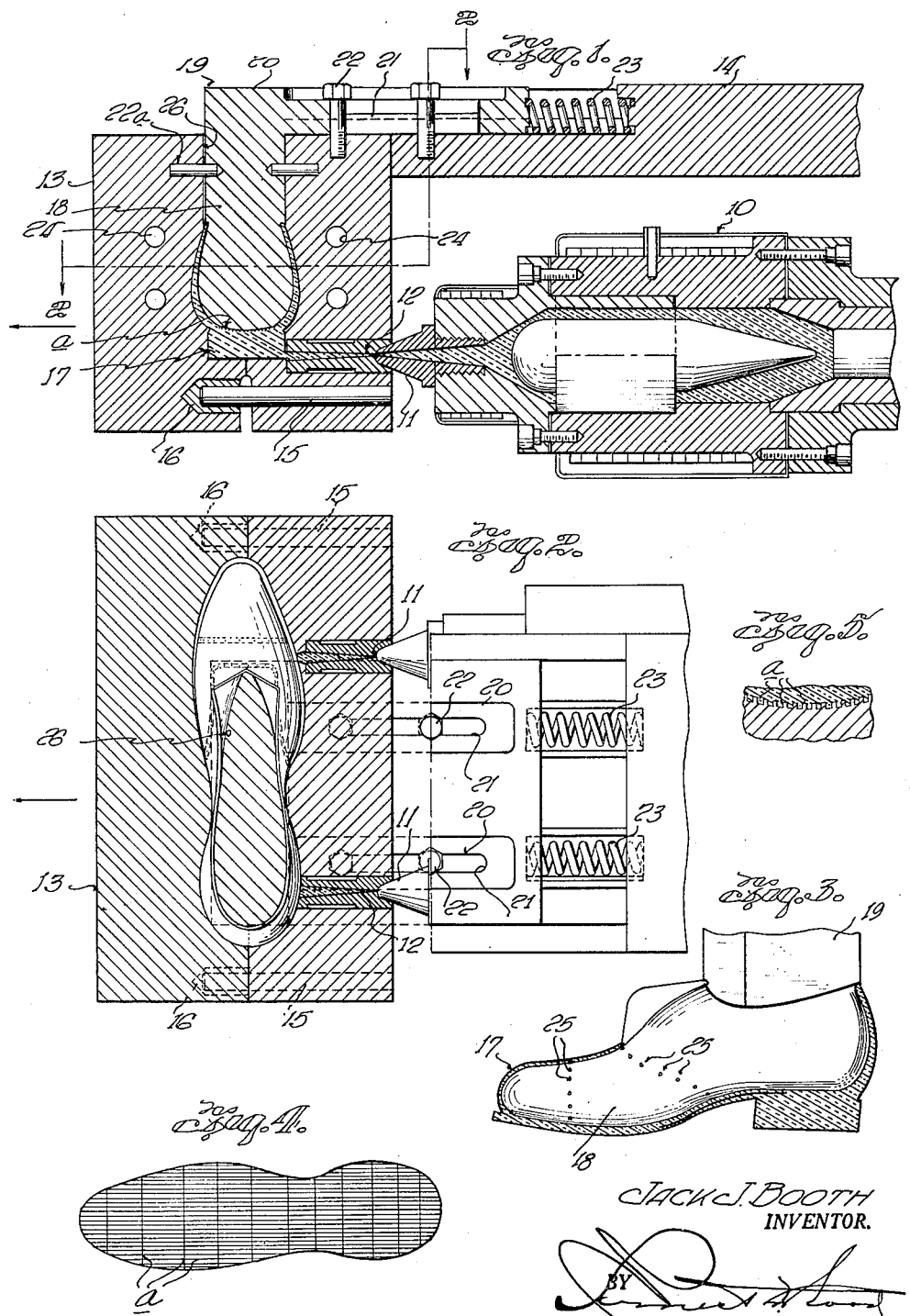

2,499,565

UNITED STATES PATENT OFFICE 2,499,565

MOLD FOR FORMING ALL PLASTIC SHOES

Jack J. Booth, Dallas, Tex.

Application May 15, 1946, Serial No. 669,989

1 Claim. (Cl. 18—42)

This invention relates to the shoemaking art and has as its principal object to provide for the manufacture of a shoe formed or molded of a suitable plastic material or materials in a single piece or unitary structure, possessing desirable texture, plasticity, flexibility, color and finish, such as described in my application Serial No. 556,183, allowed August 24, 1948, now Patent Number 2,470,089.

To attain these desirable characteristics, the invention provides as a principal object a mold of suitable design, permitting of the introduction thereinto at suitable places of the requisite quantities of materials, which will unite and bond into a finished, one piece shoe, as the molding and curing processes are developed, the finished product to possess the desired characteristics indicated.

Another object of the invention is to provide an article of new manufacture, particularly an all plastic shoe, especially a shoe of all plastic material having means produced by a mold for insulating the wearer's foot against heat irritation or lack of ventilation by incorporation in the mold certain prerequisites for creating in the finished article a multiplicity of minute recessions or grooves, preferably running lengthwise of the sole, heel and toe combined with transverse, interconnecting recessions or grooves which extend at least the width of the interior of the sole of the shoe.

Features of accomplishment are pointed out in the following description together with the accompanying drawings, in which:

Figure 1 is a schematic end view of a mold and injection apparatus in vertical section showing the manner in which a one piece shoe is produced.

Figure 2 is a plan view, partly in section, taken on line 2—2 of Figure 1.

Figure 3 is a side elevation of the inner mold form showing a section of shoe thereon.

Figure 4 is a plan view of a grooved sole of a shoe produced from the mold of the invention, and Figure 5 is a magnified end sectional view of the sole as shown in Figure 4.

In the several views, like references indicate similar elements, in which 10 is a conventional apparatus for injecting plastic material at desired temperatures and suitable pressures through ports or nozzles 11 into suitable receiving ports 12 of my mold 13, while 14 is a structure for supporting mold 13 in such a manner that when the mold is brought into operating relation with the injection apparatus 10 the discharge nozzles 11 will be brought into sealed registry with receiving ports 12 of the mold. Any suitable means, such as a hydraulic ram or pressure apparatus (not shown) may be used to bring and retain the mold and injection apparatus into operative relation. One part of the outer mold 13 is rigidly attached to support 14 and the other part is guided into operative position by guide pins 15 received by openings 16 in respective parts of the outer mold 13. The outer mold 13 is provided with a cavity 17 in the form of the outer surface of the shoe to presently be molded and is adapted to receive the inner form 18 in the shape of the inner surface of the desired shoe to be formed. Inner form 18 is provided with a shank 19 and an extension 20 for retaining the respective mold parts in desired relation during necessary manipulation, to facilitate which extension 20 is provided with slotted openings 21 for receiving studs 22 threadedly engaging support 14. The mold parts 13 are provided with guide and retaining pins 22a to be received by suitable openings in the shank 19 of the inner form 18 as the assembled mold is brought into position. The space or cavity thus secured is the exact shape and form to provide the desired thickness of the finished shoe in all its parts.

To further facilitate manipulation of the parts, compression springs 23 are operatively positioned between support 14 and extension 20 so as to be compressed, as parts of outer mold 13 are brought together about the inner mold 18 and operatively with the injection apparatus and exert a pressure tending to effect separation of the parts of mold 13, as the molding cycle is completed. For maintaining desired working temperatures in the molds they are, or may be provided, with openings 24 for suitable media to be circulated by conventional means, which media are employed at temperatures necessary to effect proper temperature control in the molds.

The mold 18 may be provided with projections 25, which may be used as spacers for the mold parts, and to create desired artistic designs on the finished shoe, as well as ventilation openings at desired positions in the shoe structure.

Space at the juncture of the mold parts usually will be found adequate for escape of entrapped air from the mold cavity. However, auxiliary openings 26 are provided when desired to facilitate the flow of materials being introduced into the mold.

While only two openings 12 are shown for receiving the material into the mold, it is obvious that any number may be provided to effect proper flow of materials of desired or varied texture, plasticity, porosity, color or the like to make a completed shoe having all desired characteristics. The operation of forming a shoe is readily performed by closing the mold and inducing the proper temperature by means of the circulating medium and bringing the molds into position to receive the plastic materials of the desired consistency, color, etc. and of proper quantities, and at the proper number and positions from the injection apparatus to form the shoe, and maintaining these materials in the mold for such period or cycle of time, and at temperatures and pressures required to secure the bonding and curing thereof into a shoe of one piece.

It will be readily understood by those skilled in the art that as materials vary in characteristics or properties, adjustments and variations of the several details of the apparatus may be required to effect the desired results. These variations may include temperatures, pressures, number and location of introduction points for the material as well as escape vents for air and overflow of material and time cycle of operations.

It will readily occur to those skilled in the art that reinforcements or inserts such as in the arch, heel or toe, may be incorporated in the shoe by positioning these elements in the mold cavity so that the material flows about them in the manner desired and cures with such elements in place.

Moreover, as illustrated in Figures 4 and 5, the inner sole A as well as the inner side surfaces of the shoe may be provided with minute grooves a for ventilation purposes as produced by the mold extending both longitudinally and transversely of the sole.

Also the desired finish or design may be provided on any part of the shoe by the finish or design of the corresponding mold surface.

When the molding operation is completed the pressure is released on the parts of the outer mold 13 and the compressed springs 23 urge the mold 18 and a part of the mold 13 away from the other part of the mold 13, thus exposing a portion of the finished shoe. The remaining portion of the mold 13 is then removed and the finished plastic shoes manipulated off of its inner form 18 by hand or other suitable means.

Most materials suitable for manufacture of plastic shoes will possess sufficient elasticity to permit of ready removal from the mold 18 and projections 25. Where other materials are used I may provide a collapsible inner mold or provide for retractible projections 25 to facilitate removal of the finished shoe from the mold.

Manifestly, the construction as shown and described is capable of some modification and such modification as may be construed to fall within the scope and meaning of the appended claim is also considered to be within the spirit and intent of the invention.

What is claimed is:

In a mold for forming shoes of plastic material having integral soles, heels and uppers, comprising in combination a fixed mold member provided with a cavity in one face corresponding to the outer surface of half the width of the shoe through said sole, heel, and upper, said member having a plurality of feeding ports communicating with the cavity adapted to register with plastic injecting apparatus; a support from which said mold member depends, a movable mold member having guide pins slidable in openings in the fixed member and provided with a complementary cavity in its face adjacent the fixed member corresponding to the outer surface of the other half of the width of the shoe through said sole, heel, and upper; each of said mold members having fluid-circulating ducts extending therethrough, an inner mold member having a shank on the support and slidable towards and away from said fixed mold member and having a forming surface adapted to be disposed within the cavities of said fixed and movable mold members and spaced therefrom to define the shape and thickness of the upper and sole; minute longitudinal and transverse ridges in closely spaced relationship on the undersurface of said inner mold member and, compression springs interposed between the shank of said inner mold member and said support to exert yielding pressure tending to effect lateral separation of the members of the mold.

JACK J. BOOTH.

REFERENCES CITED

The following references are of record in the file of this patent:

UNITED STATES PATENTS

| Number | Name | Date |
| --- | --- | --- |
| 1,498,335 | Von Hambach | June 17, 1924 |
| 1,749,013 | Wolfe et al. | Mar. 4, 1930 |
| 1,838,540 | Dunker | Dec. 29, 1931 |
| 2,046,372 | Engstrom | July 7, 1936 |
| 2,297,994 | Vellinga | Oct. 6, 1942 |
| 2,300,912 | Dodge et al. | Nov. 3, 1942 |
| 2,377,892 | Lippincott | June 12, 1945 |
| 2,421,928 | Davis | June 10, 1947 |